W. LOCKWOOD.
Motors.
No. 148,311. Patented March 10, 1874.
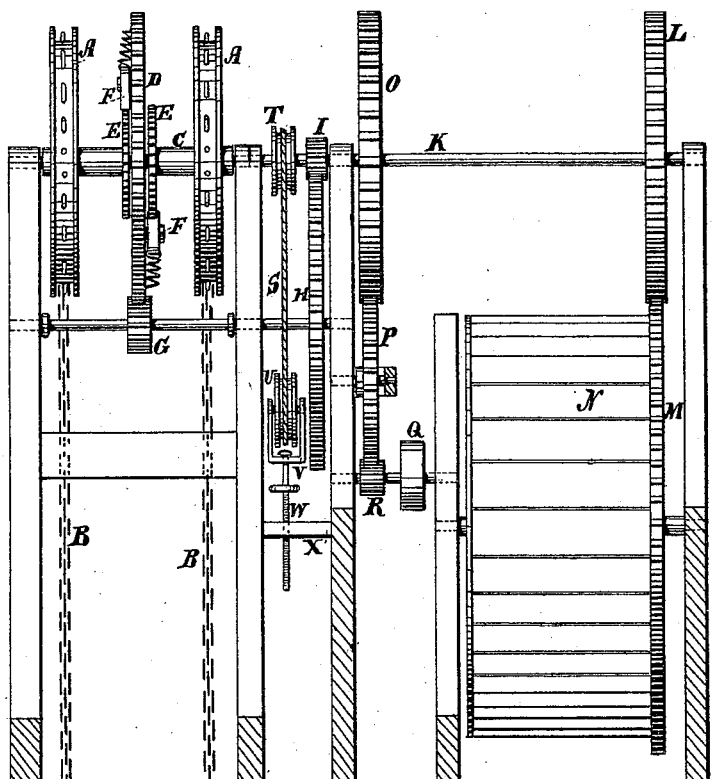
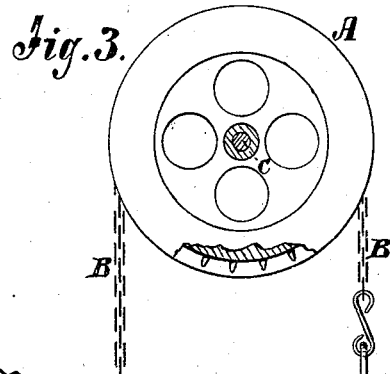
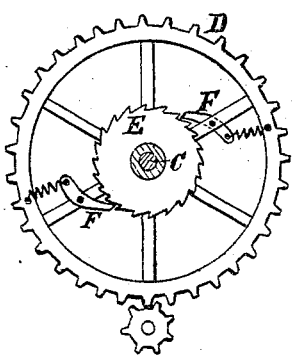
Witnesses.
Inventor.
W. Lockwood
Per ———
Attorneys.

UNITED STATES PATENT OFFICE.

WILLIAM LOCKWOOD, OF ST. LOUIS, MISSOURI.

IMPROVEMENT IN MOTORS.

Specification forming part of Letters Patent No. 148,311, dated March 10, 1874; application filed August 9, 1873.

*To all whom it may concern:*

Be it known that I, WILLIAM LOCKWOOD, of St. Louis, in the county of St. Louis and State of Missouri, have invented a new and Improved Power Apparatus, of which the following is a specification:

My invention consists of a weight-and-pulley mechanism and a water-power mechanism geared together and combined in one apparatus, the weight mechanism being large, slow, and powerful, and the water-wheel apparatus being comparatively small and quick in speed, so as to be, to a considerable extent, a regulator of the speed, by varying the quantity of water applied. Thus the power is more useful for different purposes than a weight-power only, and the weight helps out the water largely when the supply is limited. It is designed to provide a simple and efficient power for domestic purposes, for which the water may be obtained in sufficient quantities from the hydrant.

Figure 1 is a side elevation of my improved power apparatus and section of the frame or housings. Fig. 2 is a section of the shaft of the weights and pulleys, showing the arrangement for winding up the weights without turning the transmitting-wheel backward; and Fig. 3 is a side elevation of one of the chain-pulleys and weighted chains, the pulley being broken out to show the teeth for holding the chains.

Similar letters of reference indicate corresponding parts.

A represents the pulleys for the weighted chains B. They are mounted on the shaft C. The ratchet-wheels E and pawls F are combined with the wheel D, which gears with a pinion, G, on a shaft on which is a large multiplying-wheel, H, which gears by a pinion, I, with a shaft, K, on which is a large wheel, L, which gears with the toothed rim M of the water-wheel N. Said shaft also has a large multiplying-wheel, O, which gears with an idle-wheel, P, which drives the transmitting-pulley Q, by the pinion R. S is a belt running over a pulley, T, on shaft K, and another pulley, U, in a block, V, which is attached, by the screw W, with the stationary support X, so that the tension of the belt may be varied to employ it for a brake, in case of need, for slowing the machine and stopping it.

Any number of weighted chains and pulleys may be employed, according to the power required, and, if all are not needed at once, one or more chains can be lifted off the pulleys readily when the weights are down, or the weights can be lifted off the chains.

When the requisite power is obtained, or nearly the required amount, by the chains and weights, the speed can be nicely adjusted to the requirements of the case in hand by the amount of water let onto the wheel.

For small power for domestic uses, such as driving churns, sewing-machines, &c., this method of regulating the speed is a very desirable one, because a weight-power alone cannot be regulated without wasting much of the power by a brake, whereas the water-wheel apparatus can be regulated within a wide range merely by opening the cock more or less, and, as water cannot be had from the hydrants in sufficient quantity alone, the auxiliary weight-power is a matter of necessity to it.

Having thus described my invention, I claim as new and desire to secure by Letters Patent—

The shaft K, having a wheel, O, operated by weight-driven mechanism, and a wheel, L, operated in the same direction by a water-driven wheel, M N, combined, as described, with mechanism P R Q, to form a motive-power for churns, sewing-machines, or analogous purposes.

W. LOCKWOOD.

Witnesses:
A. P. THAYER,
ALEX. F. ROBERTS.